Patented July 3, 1945

2,379,609

UNITED STATES PATENT OFFICE 2,379,609

COATING COMPOSITIONS CONTAINING COUMARONE-INDENE POLYMERS

Robert C. Swain, Riverside, and Pierrepont Adams, Stamford, Conn., assignors to American Cyanamid Company, New York, N. Y., a corporation of Maine No Drawing. Application September 28, 1940, Serial No. 358,836

4 Claims. (Cl. 260—42)

This invention relates to coating compositions containing coumarone-indene polymers and melamine-formaldehyde resins.

An object of this invention is to improve the physical and chemical properties of coumarone-indene compositions, e. g., light stability, color, sensitivity to solvents, etc.

Another object of this invention is to provide compositions containing coumarone-indene polymers and compatible proportions of compatible melamine-formaldehyde resins.

These and other objects are attained by blending coumarone-indene polymers having a melting point of about 115–135° C. with a melamine-formaldehyde resin which has been alkylated with a butanol and wherein the molal ratio of formaldehyde to melamine is at least about 4:1.

The following examples in which the proportions are in parts by weight are given by way of illustration and not in limitation. The coumarone-indene resin used in the following examples is a product melting at 115–125° C. and sold under the trade name "Cumar MH-1" by the Barrett Company.

Example 1

| | Parts |
|---|---|
| Melamine-formaldehyde resin "A" | 25 |
| Coumarone-indene ("Cumar MH-1") | 75 |

A composition containing these ingredients is prepared by admixing 50 parts of melamine-formaldehyde resin "A" solution (50% resin) with 150 parts of "Coumarone-indene stock solution" (containing 50% of coumarone-indene resin and 50% of xylene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "A" | 90 |
| Coumarone-indene ("Cumar MH-1") | 10 |

A composition containing these ingredients is prepared by admixing 180 parts of melamine-formaldehyde resin "A" solution (50% resin) with 20 parts of "Coumarone-indene stock solution." Films of the composition are applied to metal objects and baked at a temperature of about 135° C. for about one-half hour. A clear, tough film is formed.

Example 3

| | Parts |
|---|---|
| Melamine-formaldehyde resin "B" | 10 |
| Coumarone-indene ("Cumar MH-1") | 90 |

A composition containing these ingredients is prepared by admixing 20 parts of melamine-formaldehyde resin "B" solution (50% resin) with 180 parts of "Coumarone-indene stock solution." Films of the composition are applied to metal objects and baked at a temperature of about 135° C. for about one-half hour. The product formed is a very hard, clear coating.

Example 4

| | Parts |
|---|---|
| Melamine-formaldehyde resin "B" | 50 |
| Coumarone-indene ("Cumar MH-1") | 50 |

A composition containing these ingredients is prepared by admixing 100 parts of melamine-formaldehyde resin "B" solution (50% resin) with 100 parts of "Coumarone-indene stock solution." Films of the composition are applied to metal objects and baked at a temperature of about 135° C. for about one-half hour. A water-white film having good chemical properties is formed.

Example 5

| | Parts |
|---|---|
| Melamine-formaldehyde resin "C" | 10 |
| Coumarone-indene ("Cumar MH-1") | 90 |

A composition containing these ingredients is prepared by admixing 20 parts of melamine-formaldehyde resin "C" solution (50% resin) with 180 parts of "Coumarone-indene stock solution." Films of the composition are applied to metal objects and baked at a temperature of about 135° C. for about one-half hour. A hard, transparent film is produced.

Example 6

| | Parts |
|---|---|
| Melamine-formaldehyde resin "C" | 50 |
| Coumarone-indene ("Cumar MH-1") | 50 |

A composition containing these ingredients is prepared by admixing 100 parts of melamine-formaldehyde resin "C" solution (50% resin) with 100 parts of "Coumarone-indene stock solution." Films of the composition are applied to metal objects and baked at a temperature of about 135° C. for about one-half hour, to give a smooth, transparent finish.

Example 7

| | Parts |
|---|---|
| Melamine-formaldehyde resin "C" | 90 |
| Coumarone-indene ("Cumar MH-1") | 10 |

A composition containing these ingredients is prepared by admixing 180 parts of melamine-formaldehyde resin "C" solution (50% resin) with 20 parts of "Coumarone-indene stock solution." Films of the composition are applied to metal objects and baked at a temperature of about 135° C. for about one-half hour. The product is a hard transparent coating which has good film strength.

*Preparation of melamine-formaldehyde resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "C"*

| | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

Coumarone-indene polymers suitable for use according to our invention may be prepared by polymerizing mixtures of coumarone and indene usually in solution in coal tar fractions with a suitable catalyst, e. g., sulfuric acid, boron trifluoride, etc. The polymerization is carried out sufficiently to form polymers having a melting point between about 115° and 135° C. The polymerization and purification of polymers of coumarone and indene is well known and any of the known methods may be used. Besides being an index of the degree of polymerization, the melting point is also of importance as an index of the compatibility characteristics of the polymers. Polymers suitable for use according to our invention should have a melting point between about 115° and about 135° C. In place of part or all of the coumarone-indene polymers used in the above examples, polymers which are essentially indene polymers or essentially coumarone polymers may be substituted.

Alkylated melamine-formaldehyde resins may be produced in accordance with the procedure outlined above as well as in any other suitable manner. Aqueous syrups of melamine-formaldehyde resins may first be produced and alkylated either simultaneously with dehydration or subsequent to dehydration. Generally the simultaneous condensation of melamine, formaldehyde and a suitable alcohol is used because of convenience. The condensation may be carried out either with or without an acid catalyst and in some instances, basic catalysts may desirably be utilized.

The melamine-formaldehyde resins vary slightly according to minor variations of control during their production and in some instances small proportions of a suitable solvent material, e. g., benzene, xylene, toluene, acetone, etc., may be added to the original solutions of coumarone-indene polymers and melamine-formaldehyde resin in order to produce perfectly clear solutions if such solutions are not originally obtained.

While formaldehyde has been used in the previous examples, it will be obvious that other aldehydes such as various polymers of formaldehyde, e. g., paraformaldehyde, or substances which yield formaldehyde may be used in place of part or all of the formaldehyde.

The melamine resins suitable for use herein may be alkylated with n-butyl alcohol or they may be alkylated with other butyl alcohols or mixtures of butyl alcohols. Melamine-formaldehyde resins which are alkylated with alcohols other than butyl alcohols may also be blended with coumarone-indene polymers having a melting point between about 115° and 135° C. in some instances. We have found that melamine-formaldehyde resins alkylated with n-propyl alcohol and having a ratio of formaldehyde to melamine of at least about 4:1 are compatible in proportions up to about 50% (total solids weight basis) with a coumarone-indene resin. Similarly, benzylated melamine-formaldehyde resins having a ratio of formaldehyde to melamine of at least about 4:1 are compatible with coumarone-indene polymers in all proportions. The term "alkylated melamine-formaldehyde resin" is intended to denote compositions which are reacted with an alcohol.

As indicated by the above examples, coumarone-indene polymers of the type employed herein have been found to be compatible with melamine-formaldehyde resins wherein the molal ratio of formaldehyde to melamine is about 4:1 up to about 6:1. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine. We have found that melamine-formaldehyde resins alkylated with n-butyl alcohol wherein the molal ratio of formaldehyde to melamine is about 3:1 or less are incompatible in all proportions with the coumarone-indene polymers. Furthermore we have found that the propylated melamine-formaldehyde resins wherein the molal ratio of formaldehyde to melamine is about 4:1 are incompatible in relatively large proportions, e. g., 90% (total solids weight basis) with the coumarone-indene polymer.

Our compositions may be used in admixture with other resinous compositions, e. g., urea-formaldehyde resins, phenol - formaldehyde resins, ester gum, chlorinated rubbers, alkyd resins, modified alkyd resins such as the terpene-maleic acid-polyhydric alcohol resins, etc. They may also be used in drying oil vehicles such as linseed oil and the like, especially in combination with soluble phenol-formaldehyde resin materials.

A wide variety of plasticizers may be incorporated into our products such as the alkyl phthalates, tricresyl phosphate, alkyd resins, etc.

Various fillers, pigments, dyes and lakes may be added to our compositions e. g., lithopone, zinc oxide, titanium oxide, ferric oxide, Prussian blue, toluidine red, malachite green, mica, ground glass, glass fibers, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Mixtures of melamine-formaldehyde resin and coumarone-indene polymers are especially suitable for use in coating compositions which require good alkali resistance, good heat resistance, good water resistance, etc. Accordingly, they are useful in floor varnishes, pipe coatings and in various other coating compositions including paints, enamels, lacquers, etc. Our products may also be useful as adhesives, in the production of printing inks, in treating paper and cloth, especially for use in the electrical industry, etc. One advantage of our melamine-formaldehyde resin-coumarone-indene polymer mixtures of especial importance is the reduced solubility and thermoplasticity as compared to compositions not containing any melamine-formaldehyde resin. The melamine-formaldehyde resin improves the color stability upon exposure to light of the coumarone-indene resins as well as improving resistance to various corrosive materials.

Obviously many modifications and variations in the processes and compositions described above may be made without departing from the spirit and scope of the invention as defined by the appended claims.

We claim:

1. A coating composition containing a hydrocarbon polymer having a melting point of about 115–135° C. selected from the group consisting of essentially indene polymers, essentially coumarone polymers, and coumarone-indene polymers and a melamine-formaldehyde resin which has been reacted with an alcohol selected from the group consisting of butyl alcohols and benzyl alcohol and wherein the molal ratio of formaldehyde to melamine is at least about 4:1.

2. A coating composition containing a coumarone-indene polymer having a melting point of about 115–135° C. and a melamine-formaldehyde resin which has been reacted with a butyl alcohol and wherein the molal ratio of formaldehyde to melamine is at least about 4:1.

3. A coating composition containing a coumarone-indene polymer having a melting point of about 115–135° C. and a melamine-formaldehyde resin which has been reacted with n-butyl alcohol and wherein the molal ratio of formaldehyde to melamine is at least about 4:1.

4. A coating composition containing a hydrocarbon polymer having a melting point of about 115–135° C. selected from the group consisting of essentially indene polymers, essentially coumarone polymers and coumarone-indene polymers and a melamine-formaldehyde resin which has been reacted with an alcohol selected from the group consisting of butyl alcohols and benzyl alcohol and wherein the molal ratio of formaldehyde to melamine is between about 4:1 and 6:1.

ROBERT C. SWAIN.
PIERREPONT ADAMS.